Aug. 26, 1952     N. C. JECKEL     2,608,124
BRAIDED PRODUCT AND METHOD FOR PRODUCING THE SAME
Original Filed June 22, 1946     4 Sheets-Sheet 1

INVENTOR.
Norman C. Jeckel
BY
George H. Corey
ATTORNEY

Aug. 26, 1952  N. C. JECKEL  2,608,124
BRAIDED PRODUCT AND METHOD FOR PRODUCING THE SAME
Original Filed June 22, 1946  4 Sheets-Sheet 3

INVENTOR.
Norman C. Jeckel
BY George H. Corey
ATTORNEY

Aug. 26, 1952 N. C. JECKEL 2,608,124
BRAIDED PRODUCT AND METHOD FOR PRODUCING THE SAME
Original Filed June 22, 1946 4 Sheets-Sheet 4

INVENTOR.
Norman C. Jeckel
BY George H. Corey
ATTORNEY

Patented Aug. 26, 1952

2,608,124

UNITED STATES PATENT OFFICE 2,608,124

BRAIDED PRODUCT AND METHOD FOR PRODUCING THE SAME

Norman C. Jeckel, Glen Falls, N. Y.

Original application June 22, 1946, Serial No. 678,595, now Patent No. 2,494,389, dated January 10, 1950. Divided and this application January 6, 1950, Serial No. 137,156

11 Claims. (Cl. 87—9)

1

The present invention relates to the art of braiding tubular products and more particularly to an improved braided tubular product and to the method and the machine for braiding such improved tubular product. This application is a division of my copending application Serial No. 678,595, filed June 22, 1946, now Patent No. 2,494,389, dated January 10, 1950, for Braided Product and Method for Producing the Same.

An object of the invention is to provide a braided tubular product in which, whether tapered or of uniform diameter, the threads comprise different materials in different sections of the length thereof.

Another object of the invention is to provide methods of producing braided tubular products having these characteristics.

It is still a further object of the invention to provide an improved machine which will carry out these and other methods of producing a braided tubular product.

I have found that a tapered braided tubular product which is substantially uniformly tight in mesh and of a uniform braided pattern both in the cylindrical portions of the tube as well as in the tapered portions thereof may be produced by having at least some of the threads which enter into the braiding operation made up of a plurality of independent strands. Thus, a given thread may consist of two, three, four or even more separate strands. These strands are not twisted together to form the thread. All of them, however, are fed together as a group into the braid as if they were a single thread delivered from the same point on the serpentine or sinusoidal path over which in the ordinary braiding operation the bobbin carriers travel. These strands, therefore, lie more or less parallel to each other in the thread in the braided pattern of the tubular product of the invention.

It is a well-konwn practice in certain textile operations simultaneously to feed a number of yarns or strands of yarn and to wind these strands together upon a bobbin in more or less parallel relation without twisting them together as ordinarily is done for making a "plied" yarn or thread. The number of strands thus wound upon the bobbin is referred to as one, two, three or more "ends up" on the bobbin, one strand of yarn thus wound being known as "one end up," two strands "two ends up" etc. Bobbins so wound with more than "one end up," if desired, may be used in the method of braiding tubular articles as is disclosed in my prior Patents Nos. 2,354,212 and 2,388,693.

In accordance with the present invention, I

2 provide the bobbin carrier, which as in the usual tube braiding machine is adapted to travel in one of two intersecting serpentine or sinuous paths about a central space, with a plurality of bobbin holders instead of a single holder. At least one, and if desired more than one or all, of these holders is removably supported on the carrier or at least one of the holders may be fixed in the carrier to maintain at least the strand of the bobbin mounted thereon for continuous feeding into the braiding operation while the other holders are removable. In the braiding of any ordinary tubular product the serpentine or sinuous paths are made endless and the braiding operation proceeds by continuous movement of the carriers, in opposite direction in the two paths, about the space enclosed by these paths and ordinarily about the common axis of the orbits of these paths. The tubular product usually is withdrawn, as the braiding thereof proceeds, from a point which is located substantially in or adjacent this central axis. The machine of the invention carries out the braiding in this manner but is constructed so that all or certain of the bobbin carriers are adapted to support a plurality of bobbin holders instead of a single bobbin holder as in the prior constructions. These bobbin carriers are spaced along the respective intersecting sinuous paths, similarly to the arrangement of the carriers in the conventional machine. The means for guiding the carriers in the sinuous paths and the driving mechanism and the various other parts associated therewith for driving the carriers, as well as the carriers themselves, are so constructed and coordinated, however, that the bobbin carries moving in one sinuous path, as well as the plurality of bobbins supported thereon, do not interfere with each other or with the carriers or the bobbins moving in the other sinuous path. Nevertheless, the machine of the invention is capable of producing a braided tubular product of the same braided pattern in the cylindrical portions and of the same size, taper, tightness of mesh and other characteristics as is produced by the machine disclosed in my prior patents. The necessary crossing of the threads from one set of bobbins in one path over those from the set of bobbins in the other path is accomplished to carry out the braiding action in such a way that all the strands of each thread are passed over all of the strands of the other threads. Individual strands of a selected thread or threads, however, may be withheld by removing from the carrier the bobbin or bobbins on which such strand is wound while leaving at least one bobbin on this carrier to supply its strand to the braided pattern.

Each of the bobbins which is carried by one of the plurality of bobbin holders supported on a bobbin carrier may have wound thereon a single strand of yarn of suitable type, either "single" or "plied" yarn, with such an amount of twist therein as is suitable for the product to be made. Each such bobbin, however, if desired, may have wound thereon a plurality of "ends up" as above defined. Within the scope of the invention the strand of yarn, or the "ends" which make up the strand, which is wound on an individual bobbin to be mounted on one of the plurality of bobbin holders on a carrier may be of different characteristics, as to fiber, size, twist, color, kind of material and other characteristics in order to secure peculiar qualities in the products, as hereafter described. It is important, however, in all such variations that the two or more strands of yarn of whatever characteristics extending from their respective bobbins on a carrier to the braiding point are not twisted or crossed over each other to any appreciable degree but substantially are maintained as separate and individual strands throughout their association with the braiding operation, so that either of them may be withheld from this operation when a change is desired.

Such a strand wound on a bobbin, whether one or more "ends up," forms with the similar strand or strands on the other bobbin or bobbins which are carried by the same bobbin carrier the thread which is to be braided into the braided pattern. All of the strands from the several bobbins of a given bobbin carrier, therefore, are fed into the braiding operation from adjacent the same point, that is the position at any moment of the given carrier in the serpentine path, and together they make up a single "thread" in the completed braid which, for example, may be laid over 1, under 1, over 1, etc. or over 2, under 2, over 2, etc., or in any other predetermined pattern determined by the design and adjustment of the braiding machine.

In order to avoid twisting together of the strands leading from the two or more bobbins on the same carrier, thus to insure their being fed into the braided pattern as individual strands available to be withheld from the braided pattern and returned thereto to secure changes in the material forming the tubular product or the diameter of the product, it is important that the bobbins on a carrier not be permitted to revolve about each other or about any axis which moves along the serpentine path or parallel thereto or which moves otherwise about the central axis. To this end the invention provides means for guiding each carrier along the serpentine paths in which it moves substantially in a constant average angular relation to the direction along or tangent to that path. The carrier is thereby prevented from rotating on any axis passing through or adjacent to or outside itself other than the axis of the orbits of the endless serpentine paths. Thus, the carrier, so to speak, always faces the axis of these orbits as it revolves about this central axis. Except for the oscillation of the carrier and of the plurality of bobbins carried thereby toward one side and the other of the path in which they move, and which necessarily is caused by the changes in the direction of the serpentine or sinuous paths, the carrier and its bobbins as they move are held in a fixed relation to the line of the path and to the radius from the central axis to the carrier.

When it is desired to change the material of which the braided tube is formed, one bobbin on each of several or all of the bobbin holders is wound with one stranded material, while another bobbin for each of the same holders is wound with a different material. Then the material of the braided tube, or of certain selected strands of the braided tube, may readily be changed by removing the set of bobbins containing one material from the bobbin holder and replacing them with the set of bobbins wound with the other material.

When it is desired to change the diameter of the braided tube, for example, to decrease the diameter, one or more of the removable bobbin holders may be removed from one or more bobbin carriers so as to withhold from the braided pattern a strand wound on the removed bobbin but not the whole thread which is composed of this withheld strand and at least one other such strand. The "thread" is now made up of a fewer number of strands. A strand in this way may be withheld from a single thread at a time or a plurality of strands respectively of threads entering the braid at different points circumferentially related to each other may be withheld at the same time. Such strands from a plurality of different threads may be withheld in succession so as to distribute the withheld strands about the circumference of the tube and lengthwise along the tapered portion thereof. The points at which the withheld strands become excluded from the pattern, that is, pass out at the surface of the tapered portion or enter the tubular space within the tubular product in the manner disclosed for the threads in my prior patents above referred to, therefore, may be distributed in the portion or portions of reduced diameter in any way convenient or suitable for securing the desired form or taper. In all such variations of the manner in which the strands are withheld from the braiding operation so as not to enter into the braiding pattern, at least one of the strands from a bobbin carried initially by the same bobbin carrier is retained in the braided pattern and is fed to the point at which the braiding operation is effected from the carrier on which initially both bobbins are mounted. Reduction in the diameter, therefore, may be secured in any desired practical way by selection of the strands to be withheld and selective removal of their bobbins from carriers distributed along the sinuous paths.

In the method of the invention utilized for producing a gradual taper, such as is required in a catheter, from the cylindrical portion to the end of the catheter, the individual strands may be withheld by successively removing from adjacent carriers in each of the sinusoidal paths, or in any predetermined regular order, one or more of the bobbins carried by these carriers at a time while retaining on these carriers at least one bobbin to maintain the prescribed pattern as above described. The succession and the order of removal and the number of bobbins removed and the number of bobbins remaining on each carrier may be varied and may be determined within the skill of the art to secure variation in the angle or shape of the taper as well as the total desired reduction in diameter of the tube.

The objects and features of the invention will be more fully described in connection with the drawings and certain mechanical features of the machine utilized to carry out the braiding operation which constitute improvements upon the braiding machines ordinarily used for the production of tubular products will become apparent from such description.

Figures 1, 8:
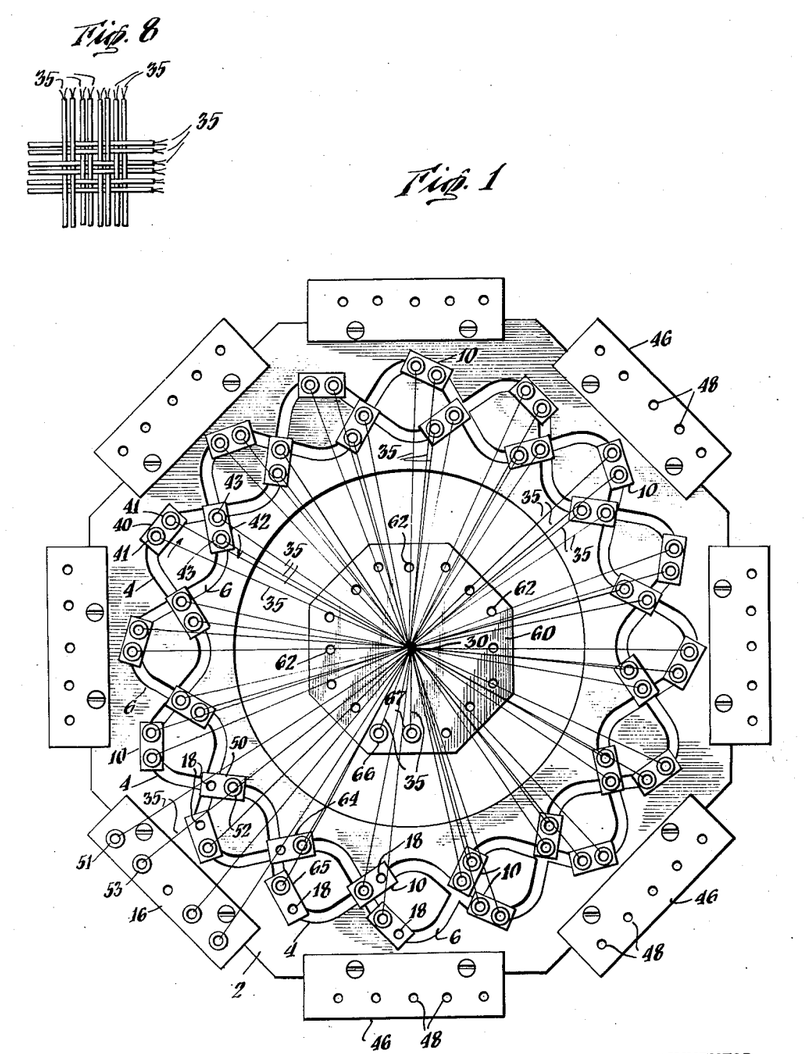
Fig. 1 is a plan view of a braiding machine constructed for carrying out the method of the invention.
Fig. 8 shows a pattern of the braided product.
Figures 3, 5:
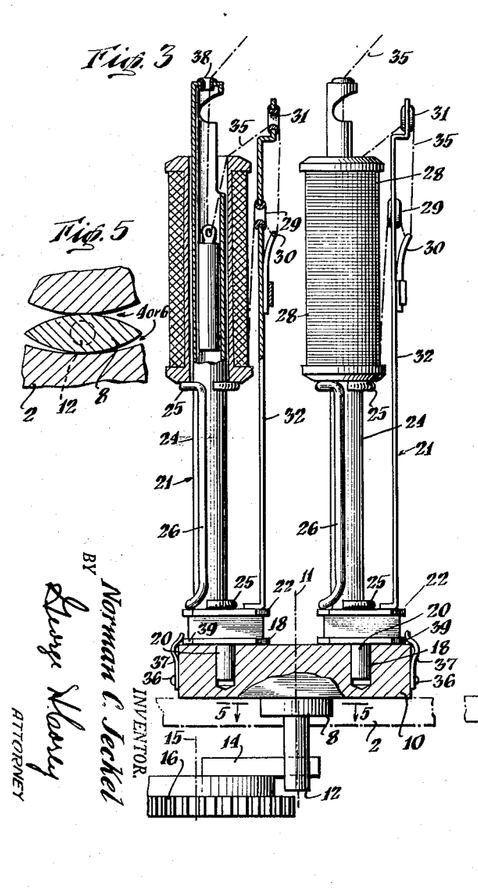
Fig. 3 is a vertical elevation of a bobbin carrier with a plurality of bobbin holders supported thereon, certain parts being shown broken away and in section.
Fig. 5 is a fragmentary section taken on line 5—5 of Fig. 3.
Figure 4:
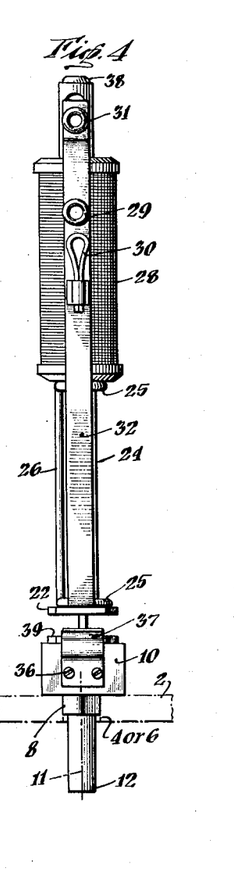
Fig. 4 is an end elevation of the carrier and holders shown in Fig. 3.

In the embodiment of the invention shown in Fig. 1, the braiding machine like those of my prior patents above referred to, is provided with a platen 2 of annular form about the central braiding axis 3. In this platen is formed a pair of sinuous grooves 4 and 6 intersecting each other and both extending about the central axis 3 to provide intersecting endless serpentine or sinuous paths along which the bobbins are moved. In each groove a foot member 8, as shown in Figs. 3 and 4, which is formed at the underside of the bobbin carrier 10 or is fastened thereto by suitable means is arranged to move lengthwise of the groove. As shown in Fig. 5, the foot member 8 is of generally elliptical shape in order to afford clearance as this foot member, together with the carrier 10, moves along the groove and passes around the curves thereof. The shape of the foot member 8 is such that while the carrier 10 may swivel on the vertical axis 11 which passes centrally through the carrier and the foot member 8, it cannot rotate a full turn or through a large angle upon this axis. The lengthwise extent of the foot member as well as of the carrier thus are maintained generally parallel to the lengthwise extent of the groove along which the carrier and its foot member are moved as may be seen from Fig. 1. Although the carrier 10 supporting a plurality of bobbins may angularly oscillate about its vertical axis 11 to one side or the other of the path in which it moves, it always is retained with the same side thereof substantially facing the axis 3 of the braiding operation which produces the tubular product. Twisting together of the plurality of strands which are to compose each thread of the normal braided pattern thus is prevented.

In order to move the carrier 10 and its foot member 8 along the groove in which it is placed, as just described, the carrier is provided with a base pin 12 integral with or suitably fastened to the foot member 8 and extending beneath the platen 2 into engagement with suitable driving member 14 rotatable on an axis 15 and driven by gear 16 in the manner shown in my prior Patent No. 2,354,212 or by any suitable means such as are utilized in conventional braiding machines. The driving mechanism represented by the member 14 and the gear 16 may be constructed within the skill of the art to move the several carriers taking into consideration the requisite length of these carriers so that they will clear each other and so that the bobbins carried thereby will properly effect the necessary crossing of the threads without mechanical interference of the bobbins with each other or with the carriers as they move along the grooves and having regard to the oscillating movement thereof above referred to.

To provide for support of a plurality of bobbins each carrier 10 has formed therein a plurality of holes 18 the axes of which are vertical to receive respectively the base pins 20 of the bobbin holders 21. Each bobbin holder is constructed with a base member 22 of I beam section supporting a tubular spindle 24 which carries a bobbin support 26. This bobbin support may be made of a wire of suitable size having its ends 25 extending about the spindle 24 in spaced relation vertically along this spindle to position the bobbin 28 at the proper distance from the upper end of the spindle 24 and in suitable relation to the thread guides 29, 30 and 31 which are provided in the thread guide support 32 which is suitably fastened at its lower end upon the bobbin holder base 22. In the particular design of the bobbin holder, as shown in Fig. 3, within the hollow spindle 24 a weight 33 is provided which is slidable within the hollow spindle. This weight carries an eyelet 34 through which is passed the strand 35 from the bobbin 28 after this strand is threaded through the thread guides 29, 30 and 31. The requisite tension on the strand 35 being delivered to the point of braiding from the eyelet 38 positioned in the upper end of the spindle 24 is secured in consideration of the friction provided by the bobbin support 26 and the weight of the tension weight 33 as the strand is pulled from the bobbin. As each of the bobbins 28 which is carried on its bobbin holder 21 supported by the carrier 10 is provided with such tensioning means each of the strands entering the braiding operation is held under the requisite tension throughout the movement of the bobbin carrier and the bobbins carried thereby in the endless serpentine path which extends about the central axis 3 of the braiding operation.

In order to prevent rotation of the bobbin holders 21 relative to the bobbin carrier 10, where, as is usual, it is desired to prevent incidental twisting of the strand 35 in the length thereof which extends between the spindle 24 and the braiding axis, spring clips 37 are fastened at the ends of the bobbin carrier 10 by suitable fasteners 36. These clips 37 engage the lower flanges of the bases 22 of the bobbin holders. These lower flanges are provided with a straight edge 39 against which the clips 37 may bear to prevent turning movement of the base 22 and therefore of the spindle 24.

It will be apparent from consideration of Figs. 1 to 5, inclusive, and the above description of the construction of the bobbin carrier 10 and the parts supported thereby that, as each carrier moves along the groove to which it is assigned and by virtue of the intersecting arrangement of the sinuous grooves extending as endless paths about the central braiding axis 3, the braiding operation is effected with a plurality of strands 35 forming each thread which enters the braided pattern. Thus in Fig. 1 the bobbin carrier 40 supporting two bobbins 41 is in position relative to the bobbin carrier 42 supporting bobbins 43 so as to cross two strands from the bobbins 41 over the two strands from the bobbins 43 when, as shown by the arrows in Fig. 1, the carrier 42 is moving downwardly in the figure along the inwardly positioned portion of groove 6 at this place and under the strands 35 which extend from the bobbins 41 carried by the carrier 40 which is moving upwardly along its groove 4 outwardly positioned at this point with respect to groove 6. As shown in the upper part of Fig. 1, since all of the carriers 10 support a plurality of bobbins, that is two bobbins each in this embodiment and with the number and spacing of the carriers in each groove as shown, namely sixteen carriers for each groove composed of eight crests and eight valleys, the braided pattern will be formed, as shown in Fig. 8, of threads each of which is composed of two strands 35, each thread of two strands passing under two similar cross threads having two strands 35 and then over such two succeeding cross threads and then again under two such cross threads. Within the skill of the art a different pattern may be produced by suitably forming and arranging the intersecting serpentine grooves and providing a different number of bobbin carriers in relation to the number of crests and valleys and spaced suitably along these grooves. In the embodiment illustrated at least one of the two strands 35 from a carrier 10 always is led to the braiding operation at the central axis 3 and a cylindrical product having a uniform braided pattern may be secured as long as such strands continue to be led to the braiding operation. The tension of each strand 35 may be uniform as determined by the weights 33 and the uniform method of threading through the eyelets 29, 30, 31 and 38. To vary the diameter of the tube or to produce a taper therein, however, while maintaining the uniform pattern, individual bobbin holders 21 are removed from or replaced upon the carriers 10 while maintaining others of these holders on the respective carriers. The tension on the strands, therefore, is maintained the same in either portion of the bobbins.

Figure 2:
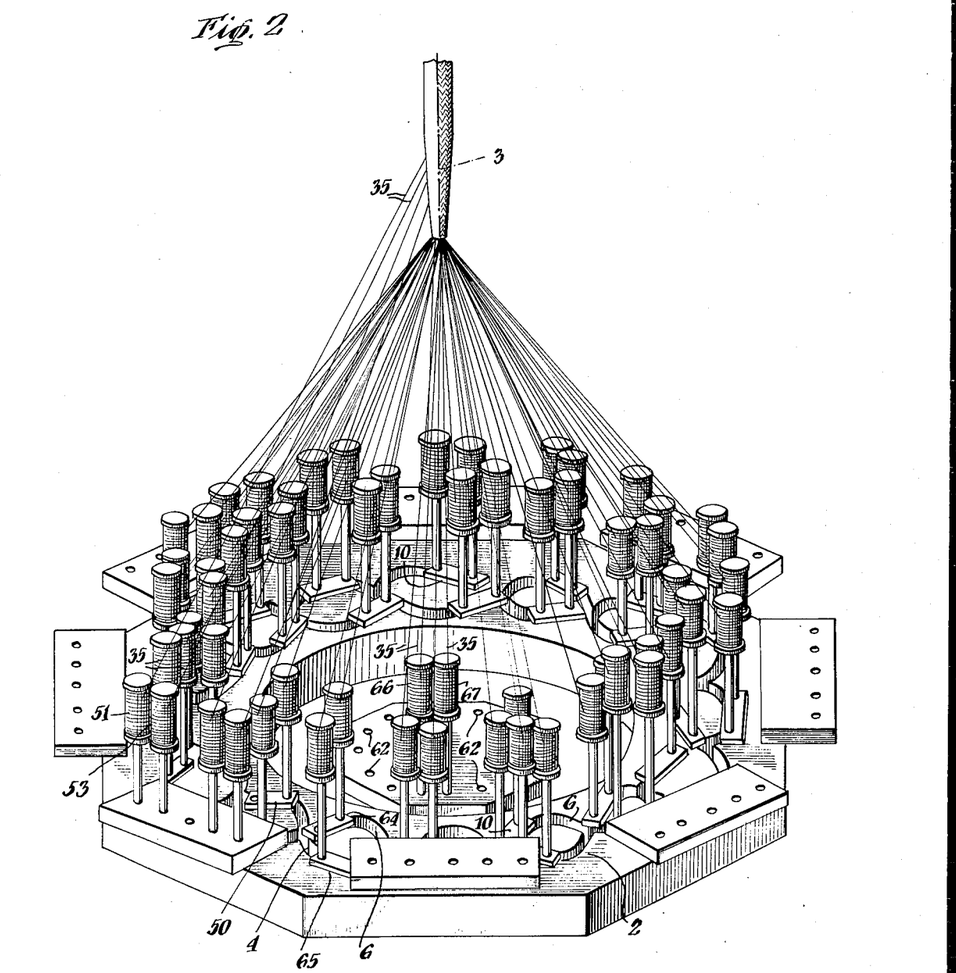
Fig. 2 is a perspective view of the braiding machine illustrating the manner in which the diameter of the tubular product is modified.

Provision is made in the apparatus of the invention, similar to that disclosed in my Patent No. 2,388,693, for support of the bobbin holders 21 and the bobbins thereon which are removed from the bobbin carriers 10 as they move along their respective grooves. For this purpose exteriorly of the sinuous paths 4 and 6 and suitably supported upon the platen 2 are provided a plurality of tables 46 positioned circumferentially about the platen 2 and about the central axis 3. In the particular embodiment illustrated in Figs. 1 and 2, in each such table five holes 48 are formed of such size as to receive the base pins 20 of the bobbin holders 21. It will be apparent that the operator of the machine may lift the bobbin holder from its position on the carrier 10 by springing the clip 37 outwardly, the strand 35 still extending from the upper eyelet 38 to the braided product at the braiding axis 3. The bobbin holder 21 thus lifted may be moved outwardly of the machine and the base pin 20 thereof inserted in one of the holes 48 of an adjacent table. In Fig. 1 from the bobbin carrier 50, for example, a bobbin holder and its bobbin 51 have been removed to the table 47 which is at the lower left hand diagonal of the figure. Similarly from the carrier 52 the bobbin holder and its bobbin 53 have been removed to this table in order that the strands 35 leading from these removed bobbins may be withheld from the braiding operation. As may be seen in Fig. 2, the removed bobbins 51 and 53 are so positioned when supported on the table 46 that their strands 35 are carried above the general cone of strands from the bobbins which are moving along the grooves. The strands 35 from these bobbins 51 and 53 thus removed leave the braided pattern exteriorly of the tubular product, as shown in the upper part of Fig. 2. Only a few of the bobbins thus removed are shown in Fig. 2 in order to avoid confusion of the lines in the drawing and of the removed bobbins with those which remain on the moving carriers. The tapered product shown in Fig. 2, however, is intended to represent that it may be produced by progressively removing a sufficient number of bobbins as the carriers move along their respective grooves about the central braiding axis 3 until a sufficient total number of strands have been removed progressively to change the diameter of the tube from that of the cylindrical portion thereof to that which is formed at the point of braiding when the last bobbin to be removed has been placed on the table 46.

Figure 7:
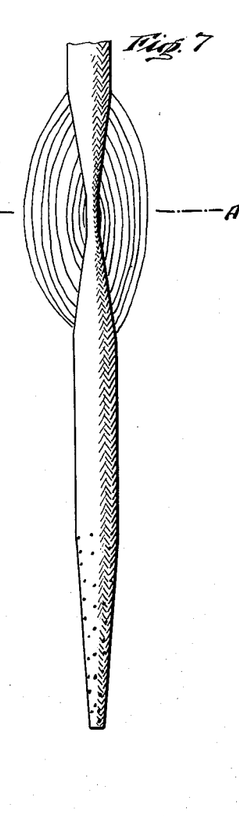
Fig. 7 is another view of the product of the invention showing the unbraided strands withheld exteriorly of the product.

When it is desired again to increase the diameter of the tubular product the bobbins which are removed may be replaced on the respective carriers from which they were lifted and in the reverse order to that of their removal so that a continuous tubular product may be formed, as shown in Fig. 7, with the withheld strands again entering the braided pattern to produce a reverse taper. When it is desired to cut the continuous product into the units, such as the braided tubes with tapered portions which are suitable for catheters, the completed portions of the tube may be cut as on the line A—A in Fig. 7. The withheld strands of each piece which after such cutting extend outwardly of the tapered portion then may be cut off substantially at the surface of the tapered part of the tube, as shown in the lower part of Fig. 7.

In the embodiment of the invention illustrated in Figs. 1 and 2 within the central space of the platen 2 of annular form is positioned a table 60 which in this embodiment is of octagonal form. This table 60 is provided with a plurality of holes 62 positioned about the circumference thereof, these holes being of such diameter as to receive the base pin 20 of the bobbin holders which may be removed from the carriers 10. As shown in Figs. 1 and 2, for example, from the carriers 64 and 65 the bobbins 66 and 67 have been removed to the table 60 and supported thereon by insertion of the base pins 20 of their holder in the holes 62 which are at the lower octagonal edge of the table 60 in Fig. 1. As may be seen in Fig. 2, these removed bobbins 66 and 67 thereby become positioned within the cone of the strands which extend from the bobbins as they move along the sinuous paths about the central braiding axis 3. The strands 35 from the bobbins 66 and 67 therefore are withheld from the braiding operation inwardly of the braided pattern and thus become positioned within the tube as may be seen in the portion of the tube which is broken away in Fig. 6. These strands 35 which are thus withheld inwardly from the braiding operation, however, are continuous and may again enter the braided pattern when the bobbins 66 and 67 again are replaced on the respective bobbin carriers. The bobbins which are removed from the carriers and supported by the table 60 may be returned to their respective carriers in the reverse order to that of their removal thus to produce the reverse taper in the braided product.

Figure 6:
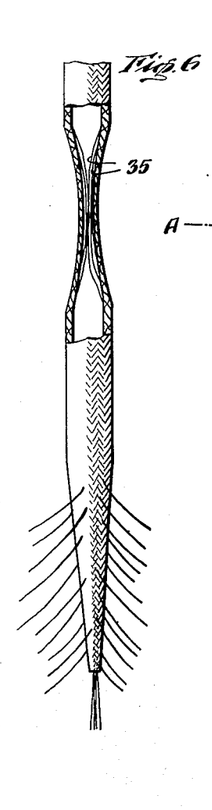
Fig. 6 is a view to enlarged scale of a tubular product having tapered portions and showing certain strands withheld interiorly and others withheld exteriorly of the product.

It will be apparent, also, that bobbins may be lifted from the several carriers to withhold their respective strands from the braided pattern and may be removed both to the tables 46 and to the table 60 in order that certain of the strands will be withheld exteriorly of the tubular product and others interiorly thereof, as shown at the lower portion of Fig. 6. This and other variations in the selection of the bobbins and of their support in their removed position may be practiced within the scope of the invention to secure variations in the diameter of the tubular product and variations in the rate of taper, generally in accordance with the disclosures in my prior Patents Nos. 2,354,212 and 2,388,693. In all cases, however, such removal of bobbins effects the withholding of strands and not the whole thread composed of these strands.

It will be apparent from the above description that in the method of the present invention of producing a tapered product in order to maintain the braided pattern a plurality of bobbins each having wound thereon at least one strand are carried on each bobbin carrier but only part of these bobbins are removed at a time from each carrier in accordance with a selected or predetermined system or order of removal. Where a tapered product is desired a progressive order of removal of the bobbins from the successive carriers may be adopted as disclosed in my prior patents but this method is applied to the removal of the individual bobbins carrying the individual strands from a plurality of such bobbins carried by each carrier. The amount of yarn which enters the braiding operation, therefore, is reduced. Such reduction, by suitable choice of the count or size of the strands, may be equivalent to a reduction of the weight of the threads entering the braided pattern which secures a result equivalent to substituting a thread of different size or weight.

Although in the particular embodiment disclosed in the drawings and above described only two bobbins are shown for each carrier 10, within the scope of the invention a greater number of bobbins than two may be carried on each carrier in order to produce particular constructions of the braided product. Other variations also may be made. For example, the carriers moving along one of the serpentine paths may be provided with a different number of bobbin holders than those moving along the other serpentine path in order that the threads which extend from the carriers in the one path shall have a different number of strands than those extending from the carriers of the other path. In this way either the size of the threads as composed of the strands may be different or they may be of different character because composed of strands which are of different size or kind or other characteristics. These and other variations both in the number of bobbins supported by each carrier and the arrangement of these carriers having a different number of bobbins along their respective sinuous paths may be made to produce tubular products of different character.

It is an important feature of the invention, however, that the tension which is secured by the weight 33 and the other co-acting parts as above described is applied to each individual strand which goes to make up a thread entering the braided pattern. Variations in the tension thus secured may be made by varying the size of the weight 33 or by the use of other suitable tensioning means in order that the tension of the strand as it enters the braided pattern may be determined and controlled. In some cases it may be desirable to provide tension in one or more of the strands of a given thread different from those of other strands of such thread. It will be apparent also that by such variations in the tension of the individual strands the total tension of the thread itself which they compose may be varied and controlled to secure the desired tightness of the mesh of the braided product. It will be apparent, too, that the tension of the individual strands, whether they enter the braiding operation to form the tubular product or on the other hand are withheld from this braiding operation, may be kept constant and uniform or of predetermined tension to secure the requisite tightness of the mesh of the braided product both in its cylindrical portion and in its taper portion.

While in the above exposition of the invention the bobbin carriers have been described as each carrying a plurality of bobbin holders each having a bobbin mounted thereon, upon each of which bobbins is wound one of the plurality of strands which make up a thread entering the braided pattern, it is within the scope of the invention to secure variation of the mesh of the braided product by providing certain carriers which support a plurality of bobbins each supplying a strand to compose a thread while others of the carriers may carry a single bobbin from which a thread is led to the braiding operation. This single bobbin and its carrier may be constructed and arranged in the manner described in my prior Patents Nos. 2,354,212 and 2,388,693, and this bobbin may be manipulated as therein disclosed. The invention, therefore comprises within its scope the withholding either outwardly or inwardly of the cone of threads, as above described, of one or more but not all of the individual strands which compose a thread of the braided pattern while at the same time another thread may be wholly withheld outwardly or inwardly of the cone of threads, with corresponding modification of the braided pattern only as to such wholly withheld thread. Particularly where the individual strands which compose the respective threads are withheld in step by step or other regularly progressive manner to secure a progressive taper of the tubular product, it will be understood that certain threads advantageously interspersed between the threads which have strands thereof so withheld, may be withheld each as a whole. By controlling the tension both of the strands and of the threads so withheld from the braided pattern in the manner above described, the requisite tightness of mesh of the braided product may be secured. The threads which as a whole are so withheld as well as the strands so withheld may again enter the braided pattern to increase the diameter of the tubular product.

It is to be understood that a braided product which is produced in the manner above described in which the bobbins carrying the threads or the strands are moved in a plurality of intersecting serpentine paths extending as orbits about a central axis to effect crossing and recrossing of the threads to secure the braided pattern in the product is inherently a tubular product. Such a tubular product, by suitable design of the braiding machine and arrangement and control of the threads entering into the braided pattern, may have a substantial internal diameter with certain of the threads located at the inner wall surface of the tube. A braided tubular product, however, may have no appreciable internal diameter and may be formed with threads located at the inner wall surface in contact substantially at the braiding axis. In certain products of the prior art within this central space a core thread is positioned, being fed within the product at the central axis in the braiding operation. It will be apparent that in the product of the present invention such a core thread may be included or those strands or threads which are withheld inwardly of the cone of threads may constitute such a core. The invention, therefore, includes all such products in which the space within the braided walls of the tube is of substantial diameter and those in which this diameter is so reduced that there is substantially no space, the braided threads being in contact with each other or with a core thread or threads.

It will be understood further that, as each bobbin carrier 10 is constructed to support a plurality of bobbins, at least one of the bobbins on each carrier or on selected carriers may carry a strand of a given material and another bobbin on the same carrier may carry a strand of a different material. When the bobbins of the given material are removed from the carrier, the strands which they contain thereby being withheld from the braided pattern, not only will the product be reduced in diameter but the composition of the braid with respect to the two materials will be changed. It will be apparent that if all of the bobbins which are mounted in the machine which carry strands of the given material progressively or simultaneously are removed from their carriers the braided product will become one from which strands of said materials are excluded and will be composed of the strands of the other material. It will be further apparent that in producing a taper at one portion of the length of the tubular product all of the strands of said given material may become withheld, the strands of the other material continuing to enter the braided pattern, while at another portion of the length of the tubular product all of the strands of said other material may become withheld, the strands of the given material in this portion of the length entering the braided pattern.

Figure 9:
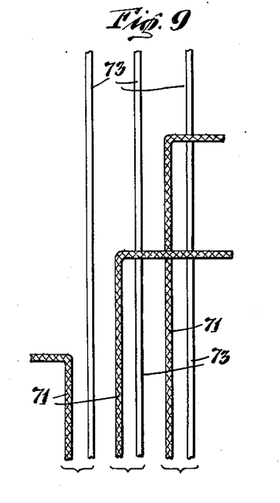
Figs. 9 to 13 inclusive are diagrammatic representations of threads composed of a plurality of strands from which certain strands are withheld or are caused to enter the thread so as to enter the braided pattern therewith.

If, for example, in Fig. 1 one of the bobbins 28 on each carrier 10 were to contain yarn of nylon and the other were to contain cotton yarn, a braided product would be produced which, because of the arrangement and number of the bobbin carriers in the particular embodiment of the machine of Fig. 1, would have a braided pattern in which each thread would consist of two strands, as diagrammatically shown in Fig. 9 one strand 71 of nylon and one strand 73 of cotton. These threads would be laid in a pattern in which each thread would pass over 2, under 2, over 2, under 2, etc. It will be apparent also, that preferably progressively in a predetermined order if it is desired to produce a tapered product, all of the nylon bobbins, for example, may be removed to the tables 46 until only those containing cotton strands are left on the carrier. The braided tube of reduced diameter, therefore, will consist entirely of cotton threads. In the structure of Fig. 9 using only two strands per thread these threads each will become constituted by the cotton strands 73 as shown at the upper part of this figure. As above explained the pattern of this tube of reduced diameter will be the same as the braided pattern of the portion of larger diameter into which both nylon strands and cotton strands enter. Moreover, by progressive and gradual replacement on the carriers of the bobbins containing the withheld nylon strands, the diameter of the tube again may be increased until all of the nylon threads are restored and the product again consists of threads composed of nylon and cotton strands. Conversely the cotton strands may be withheld from the threads by removing the bobbins which carry the cotton strands from the carriers as above described. It will be apparent that in this case the portion of reduced diameter may be composed entirely of nylon threads.

In another variation of the construction of the braided product some or all of the strands of the threads may be formed of a material having a specific property, for example, one which is opaque to X-ray or the strands may be impregnated with a material which is X-ray opaque or has other qualities requisite for clinical or other purposes. In order to provide resistance to water and to the body fluids, such as the urine, the material of one set of strands or of the other or both may be chosen to suit the purpose. This material may be one, such as that disclosed in my prior Patent No. 2,285,980 of June 9, 1942, which is meltable to provide a smooth homogeneous mass of the material throughout the length of the tubular product, such as a catheter, or in certain parts thereof. Such a meltable material may be nylon, or other plastic or a metal.

When the tubular product is composed entirely, or in part, of strands of nylon, as above suggested, or of other meltable material, especially where the nylon strands compose the portion of reduced diameter, the tapered tip of the catheter, or similar product or such part of the length thereof as is desired, may be heated as disclosed in the Patent No. 2,285,980 to produce a sufficiently fluid condition of the nylon to allow the material of the strands to flow or fuse together. Thereafter the material is allowed to set. A catheter thus will be produced in which the tip may be of homogeneous character by virtue of the melting of the nylon and the balance of the length of the catheter may be of braided construction, which may include the nylon strands, and may have the requisite flexibility and strength resisting elongation and collapsing by virtue of the tight uniform mesh produced by the method herein disclosed.

Figure 10:
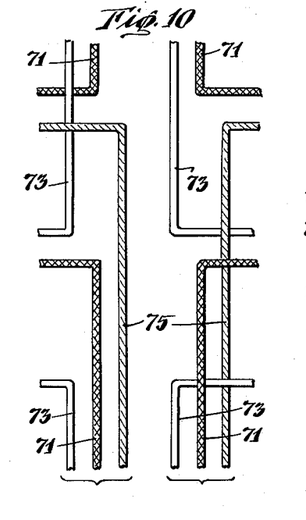
Figure 11:
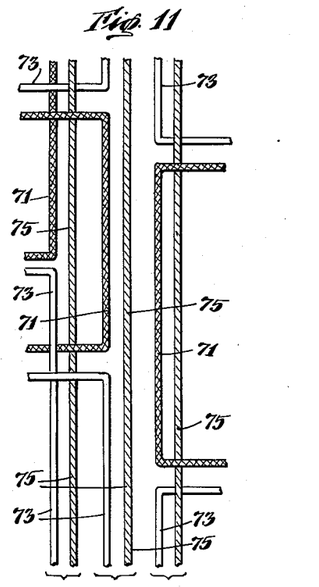

In place of nylon or cotton strands or other materials ordinarily regarded as textile materials any material may be used which is susceptible to being made in the form of a flexible strand of substantial strength which may be wrapped on a bobbin from which it may be delivered, together with other strands, to form a thread for entering the braided pattern. Metallic strands or wire may be used for part or all of the strands, or for some or all of the threads making up the braided pattern. By the method of the invention products of particular characteristics thus may be produced. Where more than two strands contained in a thread are of different materials as shown in Fig. 10 it will be apparent that one of these strands may be withheld from the braided pattern by removing its bobbin from the carrier at one part of the length of the braided product and at another part of this length a strand of a second material may be withheld, the first strand at this portion entering the braided pattern, as shown in Fig. 10, or continuing to be withheld. One or the other of these strands in another part of the length may be returned to the braided pattern while a strand of a third material 75 is withheld. Moreover, selected strands 75 or selected threads containing at least one strand of a given material may extend throughout the length of the braided product as shown in Fig. 11. Other variations and combinations may be made within the scope of the invention.

In another aspect of the invention the tubular product may be formed throughout its length with a substantially uniform braid and may be of cylindrical form as are the products shown in Figs. 10 and 11, with portions of the length made of threads composed of strands which are all or for the most part of a given material or which contain a given material and with other portions of the length of the product composed of strands which are all or for the most part of a different material or which contain a different material. In order to secure a tubular product which will be of substantially the same diameter in the several portions of the length thereof which thus are differently composed, it will be apparent from a consideration of the method above described, that when a bobbin is removed from its carrier, thereby tending to reduce the diameter, such reduction may be avoided or counteracted by replacing on the carrier a bobbin of a different material which previously has been removed from the carrier or has not yet been placed on the carrier to cause the strand to enter the braiding operation. It will be understood that, if such interchanging of the bobbins on all of the carriers were effected at one time between the bobbins containing strands of a given material and those which contain strands of a different material, the braided product would be formed with two adjacent sections of the same continuous braided pattern, each thread of the pattern containing the same number of strands in both sections. The product may have the same diameter in the two sections if the size and other characteristics of the strands of the two sections are the same or compatible. Within the scope of this aspect of the invention, however, part of the bobbins carried by the carriers may be interchanged with others carrying a different material, while other bobbins are removed from the carriers without such interchange or are replaced upon the carriers without removal of a corresponding bobbin from the carrier. Thus the diameter or the taper of the product may be changed or the taper may be formed concomitantly with change in the kind of material of which the braid is formed.

Figure 12:
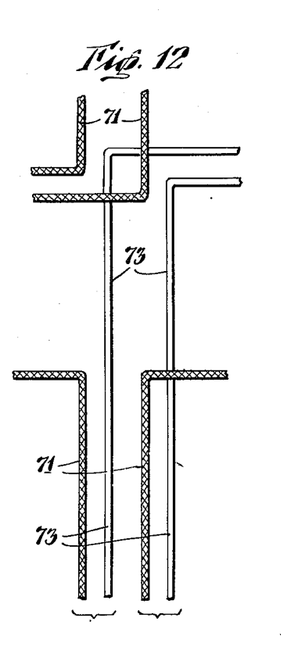

If, in the apparatus of Fig. 1, for example, one of the two bobbins on each carrier 10 carries a cotton strand 73 and the other carries a strand 71 of nylon, a braided pattern will be produced when all the bobbins are in place in which the threads will pass over 2, under 2, over 2, under 2, each thread consisting of two strands, one of cotton and the other of nylon. If, however, all the nylon bobbins are placed on the tables 46 and all the cotton bobbins are allowed to remain on their spindles on the respective carriers a braided product will be produced in which the pattern is still over 2, under 2, over 2, under 2, but the threads composing this pattern each will consist of only one strand 73, as shown in Fig. 12, instead of two.

It is apparent that a braided product of cylindrical form thus may be produced of any desired length which will be composed of the cotton strands, although it will be of less diameter than when both cotton and nylon enter the braided pattern. If, now, all of the bobbins carrying the cotton strands 73 are removed from the carriers 10 and are placed on the tables 46 and the bobbins carrying the nylon strands 71 which previously were removed to these tables are placed on their respective carriers the braided product will be of identical pattern with that previously made of cotton strands but will be composed entirely of nylon strands as shown at the upper parts of Fig. 12. Depending on the relative size of the nylon and cotton strands the diameter of the product will be the same or different in the two portions. Moreover, as those bobbins 28 which are removed on their bobbin holders 21 to the tables 46 are controlled by the tension devices associated therewith, as above described, the tightness of the mesh of the braid may be maintained in both portions of the length of the braided product. The interchanging of bobbins, of course, again may be effected when desired to braid a portion of cotton strands.

Figure 13:
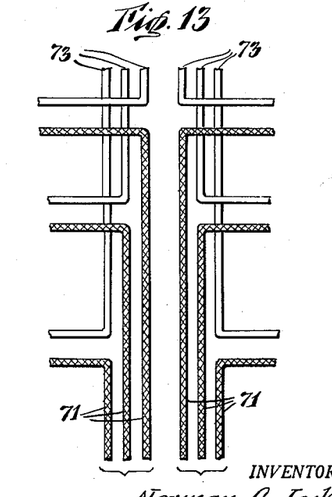

If desired, however, instead of removing all of the bobbins containing the cotton strands simultaneously with replacing of the bobbins containing the nylon strands, especially as this may involve stopping the machine, the bobbins containing the cotton strands may be removed in succession in a predetermined progressive order while the corresponding bobbins containing the nylon strands are replaced in succession on the respective carriers simultaneously with such removal. Thus there will be produced over a certain length of the tubular product a gradual change from a braid composed entirely of cotton strands to one composed entirely of nylon strands or vice versa, the intermediate portion containing strands of both kinds as shown in Fig. 13. The product, however, may be of uniform braided pattern and of uniform diameter.

Within the scope of this aspect of the invention, moreover, the method of interchanging bobbins to produce a product in which adjacent sections thereof are of different materials may be carried out to effect substitution of a whole thread composed of or comprising one material for a thread composed of or comprising another material. In order to accomplish this substitution of the full thread as compared with the substitution of one strand of a thread for another strand thereof, it is necessary to remove the bobbin which carries the whole thread or all of the bobbins which carry the strands thereof. Thus, in the apparatus disclosed in my Patent No. 2,354,212 a bobbin may be removed from a carrier to remove a thread and simultaneously a previously removed bobbin may be replaced upon its carrier. This may be the same carrier or a different carrier depending upon the total number of carriers occupied by bobbins the threads of which enter the braiding operation. It will be apparent, moreover, in the apparatus disclosed in Figs. 1 and 2 of the present application that both bobbins 28 on their bobbin holders 21 which are supported on a given carrier 10 may be removed at the same time from this carrier and two other bobbins or their respective bobbin holders may be placed upon the same carrier 10 from which the two bobbins first mentioned were removed. Such replacement of a bobbin carrying a whole thread or of two or more bobbins carrying strands of a thread may be made on an adjacent carrier or one from which the thread or the pair of strands enter the braided pattern in the same manner as the thread of the removed bobbin.

If the materials which are on the bobbins thus interchanged, whether only one per carrier or two or more per carrier, are of different kind of characteristics, it will be understood that the method of the invention will effect the change in the material of the braided pattern without necessarily changing the diameter of the tubular product. Such change in diameter may be secured, if desired, by carrying strands or threads which are of different size or other characteristics on the interchanged bobbins which would produce a change in the bulk of the product braided in the two different parts of the length thereof. The braided pattern, however, would be maintained. Moreover, the gradual or progressive interchange above proposed of the bobbins which carry strands which make up the threads entering the braided pattern also may be practiced when the interchange is effected between the bobbins carrying the whole thread or of the plurality of bobbins carrying a plurality of strands making up the whole thread.

All such variations may be made within the scope of the invention and the method of producing a braided product which utilizes such variations as well as the product itself and the machine for producing this product are intended to be covered by the claims appended hereto.

I claim:

1. A braided tubular product comprising in one portion of the length thereof threads which enter the braided pattern and comprise a plurality of strands at least one of which strands is of a given material and in another portion of the length thereof threads which enter the braided pattern and comprise a plurality of strands at least one of which strands is of a different material, the strands of said different and said given materials being excluded respectively from the threads of said first portion and said other portion.

2. A braided tubular product comprising in one portion of the length thereof threads which enter the braided pattern and are composed of a plurality of strands at least one but not all of which in each thread is of a given material and in another portion of the length of said tubular product threads which enter the braided pattern and are composed of a plurality of strands at least one but not all of which in each thread is of a material different from said given material, the threads of said first portion containing no strands of said different material and the threads of said other portion containing no strands of said given material.

3. A braided tubular product comprising in one portion of the length thereof threads which enter the braided pattern of said length and are formed only of a plurality of strands of a given material and in another portion of the length of the tubular product threads which enter the braided pattern and are formed only of a plurality of strands of a different material.

4. A braided tubular product comprising in one portion of the length thereof threads which enter the braided pattern and are composed of a plurality of strands at least some of which are of a given material excluding a different specified material and in another portion of the length of the tubular product threads which enter the braided pattern and are composed of a plurality of strands at least some of which are of said different specified material excluding said given material, said product comprising in a portion intermediate said two portions threads composed of strands formed of both said materials.

5. The method of braiding a tubular product characterized by a uniform braided pattern which comprises braiding a plurality of threads comprising a given material to produce the tubular product while withholding from the braiding operation threads comprising a different material, and interchanging in the braided pattern said threads comprising said given and said different materials by withholding from the braiding operation said threads comprising said given material simultaneously with causing said threads comprising said different material to enter said braiding operation.

6. The method of braiding a tubular product which comprises braiding a plurality of threads each made up of a plurality of strands to form the tubular braided product, at least some of the strands of at least some of said threads comprising a given material different from that of others of the strands of said threads, withholding from the braiding operation at least some of said strands of said given material, and substituting in the braiding operation for said withheld strands other strands comprising a selected material different from said given material to change the composition of the threads entering said braided pattern.

7. The method of braiding a tubular product which comprises braiding a plurality of threads each made up of a plurality of independent strands to form the tubular braided product, at least one strand of at least some of said threads being formed of a given material different from that of others of the strands of the same thread, withholding from the braiding operation strands of said given material, and replacing said withheld strands in the respective threads by strands of a selected material different from said given material.

8. The method of braiding a tubular product which comprises braiding a plurality of threads comprising a given material to form the tubular braided product, withholding under tension from the braiding operation said threads comprising said given material, and causing to enter the braiding operation threads comprising a selected material different from said given material in substitution for said withheld threads.

9. The method of braiding a tubular product which comprises braiding a plurality of threads comprising a plurality of strands of a given material to form the tubular product, withholding in step by step manner from said threads in the braiding operation strands of said given material, and causing to enter the braiding operation in step by step manner strands of a selected material different from said given material in substitution for said strands withheld from said threads.

10. A braided tubular product having a portion in which threads enter into a predetermined braided pattern and individually comprise a plurality of strands, and another portion spaced along said tubular product from said first portion in which at least some of said threads enter into the same predetermined braided pattern as in said first portion and respectively comprises at least one strand which entered into said braided pattern in the first portion and from which at least another strand of the same thread is excluded in said second portion of said product, said threads in said second portion respectively comprising at least one strand replacing said excluded strand and of a material different from said excluded strand.

11. The method of braiding a tubular product which comprises braiding a plurality of threads to produce a given portion of the tubular product, at least some of said threads being composed of a plurality of strands, withholding from entering the braiding operation at least some of said strands of some of said threads while maintaining other strands of said threads in the braiding operation to produce a portion of said tubular product spaced therealong from said given portion, and concomitantly with said withholding of said strands causing to enter the braiding operation to replace at least some of said withheld strands by strands of selected material different from said given material.

NORMAN C. JECKEL.

REFERENCES CITED

The following references are of record in the file of this patent:

UNITED STATES PATENTS

| Number | Name | Date |
|---|---|---|
| 468,997 | Mundt | Feb. 16, 1892 |
| 1,249,661 | Osaki | Dec. 11, 1917 |
| 1,499,830 | Krissiep | July 1, 1924 |
| 2,102,829 | Boivin | Dec. 21, 1937 |
| 2,148,164 | Krippendorf | Feb. 21, 1939 |
| 2,407,929 | Jeckel | Sept. 17, 1946 |
| 2,444,436 | Goepfert | July 6, 1948 |